May 10, 1966     J. C. HOWLETT     3,250,434
ELECTROLYTE CONTAINER FOR DRY CHARGE BATTERIES
Filed July 6, 1964
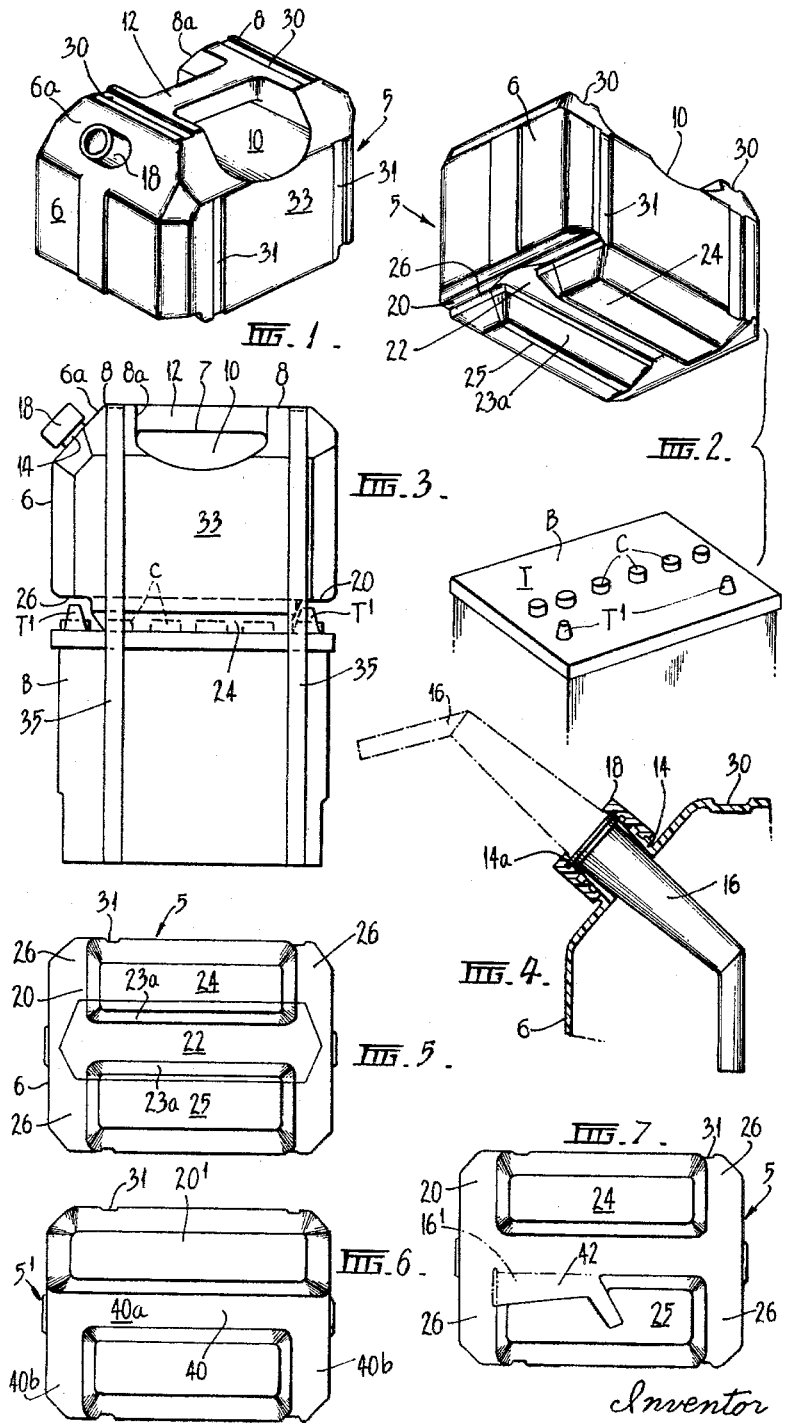
Inventor
John C. Howlett
by Sommers & Young
Attorneys

United States Patent Office 3,250,434
Patented May 10, 1966

3,250,434
ELECTROLYTE CONTAINER FOR DRY CHARGE BATTERIES
John Cavill Howlett, Cheltenham, Victoria, Australia, assignor to Dunlop Rubber Australia Limited, Melbourne, Victoria, Australia
Filed July 6, 1964, Ser. No. 380,428
5 Claims. (Cl. 222—143)

This invention relates to dry charge batteries which are supplied to the user with the requisite volume of eletrolyte in a separate container.

The present packaging of the battery and the separate container produces a bulky parcel inconvenient to the purchaser for carrying and transport.

Moreover, the stacking of the batteries and electrolyte containers in the garage or storeroom has, in view of their relative different sizes and shapes, presented a problem arising from the amount of space involved.

It is the principal objective of the invention to provide an improved effective electrolyte container for a dry charge battery and adapted for convenient assembly with an attachment in superposed relation to said battery to provide a unit pack for storage or display, and convenient carrying by the user or purchaser.

It is a further objective of the invention to provide a dry charge battery and an electrolyte container holding a commensurate charge for the filling of the former, and adapted for assembly and detachable fastening in superposed relation to form a unit pack suitable for convenient carrying by the purchaser or vertical stacking in the display or store room.

With the abovestated principal objective in view, there is provided according to the invention an electrolyte container for dry charge batteries, comprising a hollow moulded body having a sealable opening for filling with a predetermined volume of electrolyte, the bottom of said body being formed to seat upon the top of a dry charge battery and protectively cover the upstanding filler caps and terminal posts of said battery, and a handle upon said body to carry the unit pack provided upon the fastening of the electrolyte container to said battery.

Thus the user upon purchase of the unit pack has the required volume of electrolyte to charge the battery, and the filler caps and terminal posts of the latter lying under the bottom of the electrolyte container are adequately protected against damage during storage and transport. The handle provides for the convenient carrying of the unit pack by the user.

Conveniently, upon the electrolyte container being seated upon the top of the dry charge battery, the walls of each are generally vertical and coextensive and the top of the container has parallel flat surfaces to permit the stacking thereon of an equivalent unit pack to facilitate the storing of the unit packs ready for supply.

The handle is integral with the body and located between the abovementioned surfaces in an arrangement to permit unobstructed stacking of the unit packs.

The accompanying drawings depict a practical arrangement of the electrolyte container according to the invention.

In these drawings:

FIGURE 1 is a perspective view of the electrolyte container.

FIGURE 2 is a perspective view of the electrolyte container ready to be dropped onto the top of the dry charge battery.

FIGURE 3 is a side elevation illustrating the electrolyte container assembled with the dry charge battery ready for transport or storage.

FIGURE 4 is a section through the filler opening showing the reversible pouring spout in position in said opening.

FIGURE 5 is an underside plan view of FIGURE 1.

FIGURE 6 is an underside plan view of a modified electrolyte container.

FIGURE 7 is an underside plan view of a further modification of the bottom of the electrolyte containers including a seating on the bottom for the pouring spout.

Referring now to the drawings, the electrolyte container indicated generally at 5 is blow moulded from a plastic material to form a tough stiff body, e.g., a high density polyethylene or high impact P.V.C. may be used.

The moulded body 5 of the container is of somewhat cuboidal form, i.e. the mean rectangular cross section is substantially equivalent to an area that does not substantially exceed the area of the top of the dry charge battery, and its capacity is such to provide the requisite volume of electrolyte sufficient to charge the particular battery. The remaining space in the container above the level of electrolyte is provided for ullage.

The body 5 has an average wall thickness of about 0.040 inch, the end walls 6 having upper inwardly sloping portions 6a terminating at the top 7 in flat parallel horizontal surfaces 8 which permit first the body to be strapped to the dry charge battery B and secondly to support one or more unit packs consisting of the battery B and container 5 assembly as shown in FIGURE 3, when stacked one upon the other in a display or store room.

To that end the inner opposite sides 8a of the parallel flat surfaces 8 define a central arcuate recess 10 extending for the width of the top 7 which surfaces are integral and flush with the top of a central handle forming portion 12 bridging the recess as viewed in FIGURES 1 and 3. The thickness of the handle forming portion 12 is such that a clear space is left between the underside thereof and bottom of the recess 10.

The handle 12 so formed by the said portion and the arcuate recess 10 may be gripped by passing the fingers into the recess under and around the handle. A filler opening 14 is provided in one side wall of the body 6 including a seating 14a to receive a reversible spout indicated generally at 16 for the filling and dispensing of electrolyte from the container.

The filler opening 14 is normally closed by a screw cap 18 including a sealing washer to retain the pouring spout in position.

The bottom 20 of the container 5 is formed with a deep central longitudinal recess 22 parallel to the handle 12 and defined by the inner sides 23a of a pair of complemental trough shaped base portions 24, 25 which in use seat upon the top T of the battery B.

The length of the above base portions 24, 25 in such that an equivalent space 26 is provided between the end of each said base portion 24 and end wall 6 of the container.

Thus it will be observed each abovementioned space 26 accommodates a terminal T' of the dry charge battery B when the electrolyte container 5 is lowered onto said battery whereby each terminal is protectively covered by the bottom 20 of said container as viewed in FIGURE 3. The disposition of the longitudinal recess 22 is such that it centres upon the filler caps of the battery B.

The abovementioned flat parallel surfaces each have a central longitudinal groove 30 therein, a similar vertical groove 31 being formed in the side walls 33 of the electrolyte container to receive a strip 35 of suitable material fitted with a clip or the like for temporarily fastening said container to the dry charge battery B.

Upon the electrolyte container described being seated in superposed relation upon the top of a dry charge battery B, the sides of the former are substantially coextensive in the vertical with the sides of the latter, and the filler caps and terminal posts of said battery are protectively located in the recesses in the bottom of said container between the latter and top T of the battery B as viewed in FIGURE 3.

The unit pack so formed may then be temporarily fastened by the abovementioned straps, or alternatively wires, pressure sensitive tapes or other known form of fastening used in packaging. The unit pack may be easily carried in one hand, and the container has a residual value for after use by the purchaser.

In the modification illustrated in FIGURE 6, the bottom 20' of the body of the container 5' is flat and formed with an angular recess 40, of channel shape in form, the base 40a being central upon the body and the angular ends 40b projecting to one side of the body.

The filler caps C are accommodated within central portion 40a and the terminal posts T' within the angular ends 40b when the electrolyte container 5' is seated upon the top T of the dry charge battery B.

In the modification illustrated in FIGURE 7, one of the base portions 24, 25 on the bottom of the electrolyte container has upon an inner side a shaped depression 42 to accommodate a pouring spout 16'.

This construction eliminates the necessity for the spout to remain immersed in the electrolyte until required for use.

I claim:

1. An electrolyte container comprising a hollow moulded body having a filler opening to be charged with a predetermined volume of electrolyte for a dry charge battery and having a mean cross sectional area substantially equivalent to the equivalent area of said battery, the bottom of said body having a central longitudinal recess defined by a pair of complemental base sections of even length and depth to protectively accommodate the filler caps of said battery, the base sections being spaced at each end an equivalent distance from an oppositely disposed wall of the moulded body to form an angularly related recess at each end of the longitudinal recess to accommodate the terminal posts of said battery, and a handle upon the top of the moulded body to carry a unit pack provided by the fastening of the electrolyte container to said battery.

2. An electrolyte container according to claim 1 in which the bottom of the moulded body is flat, and the longitudinal central recess merges at each end into a parallel marginal recess extending to a side wall of the moulded body.

3. An electrolyte container according to claim 1 in which one of the base sections has a recess shaped to receive a pouring spout.

4. An electrolyte container according to claim 1 in which the moulded body has upon the top a pair of flat parallel surfaces, the inner sides of which surfaces define an arcuate recess bridged by a central handle-forming portion the upper side of which is flush with said surfaces, the depth of the handle-forming portion being such as to provide a hand insertion space within the recess for the gripping of the handle.

5. An electrolyte container according to claim 4 in which the flat surfaces and a pair of oppositely disposed adjoining walls of the moulded body are formed with parallel grooves to receive flexible fastening members.

References Cited by the Examiner

UNITED STATES PATENTS

| | | | |
|---|---|---|---|
| 1,913,460 | 6/1933 | Smetana | 222—143 X |
| 2,022,595 | 11/1935 | Gowing. | |
| 2,400,197 | 5/1946 | Grodin. | |
| 2,563,141 | 8/1951 | Vazzano | 222—465 X |
| 2,950,844 | 8/1960 | Hollingshead | 222—143 |
| 3,142,320 | 7/1964 | Olson | 222—539 X |
| 3,176,879 | 4/1965 | Mojonnier | 222—143 |

FOREIGN PATENTS

| | | |
|---|---|---|
| 530,212 | 7/1954 | Belgium. |
| 99,931 | 7/1923 | Switzerland. |

RAPHAEL M. LUPO, *Primary Examiner.*